(12) United States Patent
Candell et al.

(10) Patent No.: US 7,457,398 B2
(45) Date of Patent: Nov. 25, 2008

(54) METHODS AND SYSTEMS FOR PROVIDING VOICEMAIL SERVICES

(75) Inventors: Emily A. Candell, Waltham, MA (US); William T. Barrasso, Melrose, MA (US); Paul Ketchoyian, Chelmsford, MA (US)

(73) Assignee: Comverse, Inc., Wakefield, MA (US)

( * ) Notice: Subject to any disclaimer, the term of this patent is extended or adjusted under 35 U.S.C. 154(b) by 539 days.

(21) Appl. No.: 10/061,863

(22) Filed: Jan. 31, 2002

(65) Prior Publication Data

US 2003/0142799 A1     Jul. 31, 2003

(51) Int. Cl.
*H04M 1/64* (2006.01)
(52) U.S. Cl. .................. 379/88.23; 379/68
(58) Field of Classification Search ............. 379/67.1, 379/88.11, 88.22, 88.23, 88.24, 68; 709/206
See application file for complete search history.

(56) References Cited

U.S. PATENT DOCUMENTS

| | | | | |
|---|---|---|---|---|
| 4,757,525 A | * | 7/1988 | Matthews et al. | 379/88.26 |
| 4,837,798 A | * | 6/1989 | Cohen et al. | 379/88.14 |
| 5,008,835 A | * | 4/1991 | Jachmann et al. | 704/270 |
| 5,029,199 A | | 7/1991 | Jones et al. | 379/89 |
| 5,186,629 A | * | 2/1993 | Rohen | 434/114 |
| 5,287,102 A | * | 2/1994 | McKiel, Jr. | 340/825.19 |
| 5,353,259 A | | 10/1994 | Howes et al. | 369/25 |
| 5,461,665 A | * | 10/1995 | Shur et al. | 379/88.27 |
| 5,481,597 A | | 1/1996 | Given | 379/67 |
| 5,528,670 A | * | 6/1996 | Elliot et al. | 379/88.25 |
| 5,646,982 A | * | 7/1997 | Hogan et al. | 379/88.22 |
| 5,717,742 A | * | 2/1998 | Hyde-Thomson | 379/88.17 |
| 5,812,639 A | | 9/1998 | Bartholomew et al. | 379/89 |

(Continued)

FOREIGN PATENT DOCUMENTS

WO     WO 00/27099     5/2000

OTHER PUBLICATIONS

"Voice Profile for Internet Mail—version 2"; pp. 1-53 (Sep. 1998); [online] [retrieved on Oct. 11, 2001]. Retrieved from the Internet <URL:http://www.ietf.org/rfc/rfc2421.txt?number=2421.

*Primary Examiner*—Olisa Anwah
(74) *Attorney, Agent, or Firm*—Mintz, Levin, Cohn, Ferris, Glovsky and Popeo PC

(57) ABSTRACT

The present invention relates to methods and systems for providing voicemail services having expanded functionality. One embodiment of the invention saves a copy of messages sent in the sender's mailbox. Methods and systems, according to this embodiment, mark a message sent as a 'sent message' and store the sent message in a standard message store. These methods and systems can present a full set of sent messages (sent within a configured time interval, 30 days for example) upon a specific request for sent messages. In one embodiment, a user can access these sent messages by accessing the sent message folder. Embodiments of the invention also provide a method for determining the other (if any) recipients of a received voice message. Methods and systems according to one embodiment store a full list of recipients with a message. Thus, a system according to this embodiment can present the list of recipients to the subscriber when it retrieves a message. Embodiments of the invention provide methods and systems that allow a user to copy each recipient of an original message is copied on a reply to the message if desired.

8 Claims, 7 Drawing Sheets

U.S. PATENT DOCUMENTS

| | | | |
|---|---|---|---|
| 5,872,925 A * | 2/1999 | Han | 709/206 |
| 5,878,230 A * | 3/1999 | Weber et al. | 709/238 |
| 5,943,402 A | 8/1999 | Hamel et al. | 379/88.26 |
| 5,966,351 A | 10/1999 | Carleton et al. | 369/29 |
| 5,966,663 A | 10/1999 | Gleason | 455/466 |
| 6,014,427 A | 1/2000 | Hanson et al. | 379/67.1 |
| 6,021,181 A * | 2/2000 | Miner et al. | 379/88.23 |
| 6,038,302 A | 3/2000 | Burok et al. | 379/201 |
| 6,069,940 A | 5/2000 | Carleton et al. | 379/88.04 |
| 6,072,862 A | 6/2000 | Srinivasan | 379/100.08 |
| 6,085,101 A | 7/2000 | Jain et al. | 455/500 |
| 6,088,428 A * | 7/2000 | Trandal et al. | 379/88.02 |
| 6,115,482 A * | 9/2000 | Sears et al. | 382/114 |
| 6,154,465 A | 11/2000 | Pickett | 370/466 |
| 6,173,316 B1 | 1/2001 | De Boor et al. | 709/218 |
| 6,192,396 B1 * | 2/2001 | Kohler | 709/206 |
| 6,201,814 B1 | 3/2001 | Greenspan | 370/428 |
| 6,205,330 B1 | 3/2001 | Winbladh | 455/426 |
| 6,233,318 B1 | 5/2001 | Picard et al. | 379/88.17 |
| 6,272,532 B1 * | 8/2001 | Feinleib | 709/206 |
| 6,289,312 B1 * | 9/2001 | Raman | 704/270 |
| 6,442,243 B1 * | 8/2002 | Valco et al. | 379/67.1 |
| 6,463,462 B1 * | 10/2002 | Smith et al. | 709/206 |
| 6,487,277 B2 * | 11/2002 | Beyda et al. | 379/88.01 |
| 6,668,244 B1 * | 12/2003 | Rourke et al. | 704/275 |
| 6,775,359 B1 | 8/2004 | Ron et al. | 379/88.14 |
| 6,839,411 B1 * | 1/2005 | Saltanov et al. | 379/88.13 |
| 6,912,274 B2 * | 6/2005 | Hitzeman et al. | 379/88.17 |
| 2001/0014146 A1 * | 8/2001 | Beyda et al. | 379/88.25 |
| 2002/0013817 A1 * | 1/2002 | Collins et al. | 709/206 |
| 2002/0086662 A1 * | 7/2002 | Culliss | 455/413 |
| 2003/0108166 A1 * | 6/2003 | Coppinger et al. | 379/88.11 |
| 2003/0128817 A1 * | 7/2003 | Myers et al. | 379/67.1 |

* cited by examiner

METHODS AND SYSTEMS FOR PROVIDING VOICEMAIL SERVICES

FIELD OF THE INVENTION

The present invention relates generally to methods and systems for providing voicemail services and, more specifically, to methods and systems for providing voicemail services having expanded functionality.

BACKGROUND OF THE INVENTION

A variety of consumers ranging from representatives of enterprises to individuals desire improved voicemail services in order to become more efficient. Voicemail services can include call answering and messaging. Call answering occurs when a voice mail system answers a call that a subscriber does not answer because the subscriber is on a call or is otherwise not available. Messaging occurs when a subscriber dials into a voice mail system and sends a message to another subscriber for retrieval at a later time.

A variety of companies have developed a class of computers specially designed to provide call answering and voice messaging services. These companies design the computers to interface with a telephone switch. Typically, analog networking protocols transport a message sent to another computer or device that is not within the sending computer's or device's enterprise network. The analog networking protocols are based on dual tone multi-frequency (DTMF) signaling and analog voice playback. Request for Comment (RFC) 2421 of the Network Working Group, G. Voudreuil, Voice Profile for Internet Mail (VPIM)-Version 2, September 1998, incorporated herein by reference in its entirety, provides a profile of Internet standard protocols for use as a digital voice messaging network protocol. Systems that adopt the VPIM protocols can send messages between each other.

The increase in the demand for voice messaging services, and the adoption of the above-referenced VPIM protocols, are two factors that indicate an opportunity to provide expanded functionality in voicemail services. In addition, typical voicemail systems have a number of limitations. For example, typical voicemail systems do not have a convenient mechanism to save messages sent from a specific mailbox and to provide the sender with access to those sent messages.

It is also difficult to retrieve saved messages. Typical voice message systems save all messages in chronological order and there is no method for organizing saved messages by category. In addition, such systems do not have a fail-safe way to determine the other (if any) recipients of a received voice message, or to assure that all recipients of an original message are copied on a reply to the message. Furthermore, extensions and phone numbers are difficult to remember and typical voicemail systems do not address this problem.

SUMMARY OF THE INVENTION

Embodiments of the present invention overcome the above-mentioned limitations of typical voicemail systems. One embodiment of the invention saves a copy of all or selected messages sent in the sender's mailbox. Methods and systems, according to this embodiment, mark a message sent as a 'sent message' and store the sent message in a standard message store. These methods and systems can present a full set of sent messages (sent within a configured time interval, 30 days for example) upon a specific request for sent messages. In one embodiment, a user can access these sent messages by accessing a sent message folder, a folder being a virtual collection of messages typically, though not necessarily, accessed by an audio interface.

Providing easy access to messages sent within a configured time interval facilitates the recall of specific messages using a 'Message Recall Feature.' A subscriber can designate other folders (user defined classifications) and the subscriber can move messages between folders using an interface, e.g., an audio interface.

Embodiments of the invention also provide methods and systems for determining the other (if any) recipients of a received voice message. Methods and systems according to one embodiment store a full list of recipients with a message. Thus, a system according to this embodiment can present the list of recipients to the subscriber when it retrieves a message. Embodiments can present the recipient list on request only or automatically. These embodiments can allow access to the message recipient list on a per mailbox basis.

In addition, embodiments of the invention do not present a blind copy recipient when presenting the recipient list. According to one embodiment, the system gives the sender of a message the opportunity to mark a recipient as a blind copy recipient. If the sender lists a recipient as a blind copy recipient, then a system according to this embodiment does not present the blind copy recipient upon request for the full list of recipients of a message.

Embodiments of the invention provide methods and systems to assure that all or selected recipients of an original message are copied on a reply to the message if desired. By using the stored recipient list in a message in conjunction with the recipient list access described above, a system according to this embodiment enables a reply-to-all capability. In one embodiment, a system according to the invention, before sending a reply, provides the sender the ability to review the recipient list and add or delete recipients as desired. Furthermore, according to one embodiment, recipients that were blind copied in an initial message do not receive a reply message sent to all recipients of the initial message unless explicitly added to the recipient list by the sender In addition, embodiments of the invention address the fact that extensions and phone numbers are difficult to remember. One embodiment includes the ability for a voicemail subscriber to maintain a voicemail speed dial directory for commonly accessed numbers for voice messaging and live outcalls using the live reply feature or OMD (Outdial Message Delivery). Live reply allows a user to respond to a voicemail message by calling the sender of the message with the possibility of having a live conversation with the sender in the event that the sender answers the call. OMD service provides a call-completion solution for non-subscribers of voice mail. The network-services platform automatically outdials the recipient's number and plays the message, offering the recipient an option to send a message reply.

This embodiment of the invention enables the subscriber to choose a recipient using a pre-configured code of up to 3 digits or a Dual Tone Multi-Frequency (DTMF) access code corresponding to at least some of the letters of the recipient's name. Further, one embodiment provides a user the option to record a name associated with each speed dial entry for review of entries and for recipient confirmation upon entry of the speed dial code.

Another aspect of the invention organizes messages by using pre-configured codes of up to 3 digits corresponding to groupings, or folders, of messages. According to one embodiment, a user can choose to apply either a Save operation or a Save Folder operation to a message. The Save operation saves a message without a folder affiliation. The Save Folder operation saves a message and affiliates the message with a specified folder. In one embodiment, the system completes the Save Folder operation when the user provides a code specifying a folder.

Yet another aspect of the invention provides a subscriber the option to delay message deliveries on a per message basis or for all messages sent from the mailbox. According to one embodiment until the time a message is sent, a subscriber can access all "delayed" messages by accessing an Outbox folder. The messages in this folder could be reviewed like any other message in the mailbox including reviewing the recipient list, re-recording the message (using reply to all if the same recipients are needed), changing urgency or privacy status or sending the message immediately in its original form.

BRIEF DESCRIPTION OF THE DRAWINGS

For a better understanding of the present invention, reference is made to the drawings, which are incorporated by reference and in which.

DETAILED DESCRIPTION

Figure 1A:
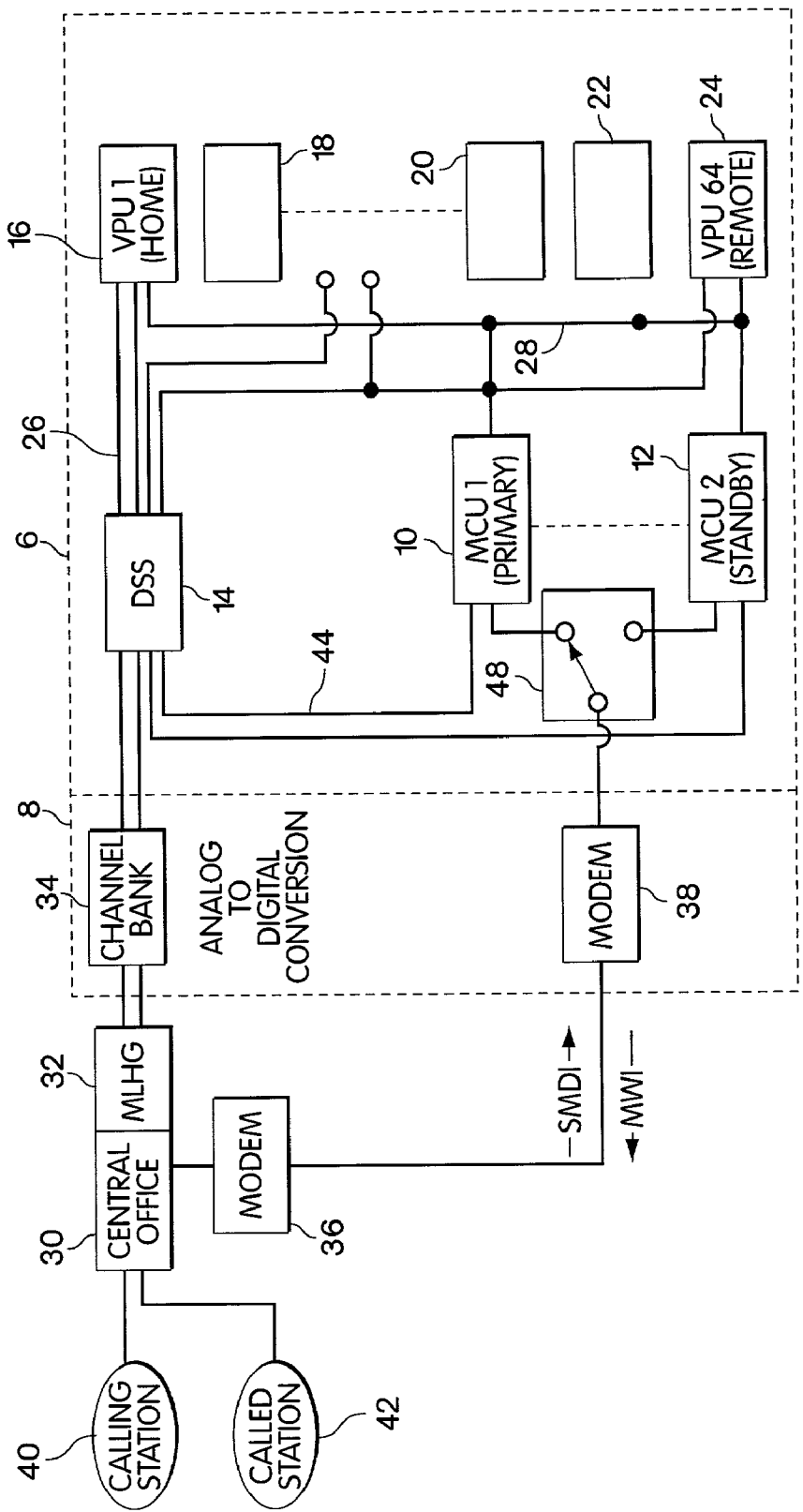
FIG. 1A is a schematic diagram of a voicemail system according to one embodiment of the invention.

The present invention relates to methods and systems for providing voicemail services having expanded functionality. FIG. 1A is a schematic diagram of a voicemail system according to one embodiment of the invention. In the illustrated embodiment, the invention is shown as an enhancement to an access multilink point-to-point protocol (MP) voicemail platform that is available from Comverse of Wakefield, Mass. Briefly, One embodiment of a system 6 according to the present invention, as illustrated in FIG. 1A, includes both primary 10 and standby 12 master control units (MCU), which control switching by a digital switching system (DSS) 14. In one embodiment, the MCU 10 coordinates the routing of calls based on conventional Simplified Message Desk Interface (SMDI) information packets from a central office 30 through the DSS 14 to voice processing units (VPUs) also known as application processing units (APUs) 16-24. Up to 64 voice processing units can be provided in the system where each voice processing unit has a T1 termination for up to 24 voice ports 26 and is capable of storing up to 110 hours of voice storage for approximately 2,200 mailboxes. In other embodiments, the system uses other networking protocols such as signaling system 7 (SS7). SS7 is a telecommunications protocol defined by the International Telecommunication Union (ITU) as a way to offload public switched telephone network (PSTN) data traffic congestion onto a wireless or wireline digital broadband network.

Assignment of an incoming call by the MCU 10 to a voice processing unit VPU/APU, occurs over an internal bus or network 28 that includes both a data bus and a voice bus. This bus 28 rather than being a traditional bus can be a network of any topology such as a star or token ring. Control data and messages between the MCU 10 and VPUs or between the VPUs is routed over the data bus of the internal bus 28 while the voice messages are routed between the VPU's over the voice bus of the internal data bus 28. It is preferred that the internal bus 28 be a standard bus such as is provided by an Ethernet. The voice and data logical buses can be implemented as a single physical bus over the Ethernet or as separate Ethernets when interprocessor voice or data communication is high.

In one embodiment, the digital switching system 14 is connected to a central office 30 through a multi-line hunt group (MLHG) 32. The central office communicates with the calling station 40 and the called station 42. This embodiment uses a digital central office so that digital voice samples are passed between the central office 30 and the DSS 14. However, if the central office is an older switch such as an AT&T 1A-ESS, a channel bank 34 can optionally be provided in the optional telephone network interface circuitry 8 for converting incoming analog signals to digital packets. Communication between the MCU 10 and the central office 30 is optionally via conventional serial modems 36 and 38 and preferably occurs in the SMDI communication format.

U.S. Pat. No. 5,029,199, entitled "Distributed Control and Storage for a Large Capacity Messaging System" and incorporated herein by reference in its entirety, describes such a system more fully. As will be obvious to those of skill in the art, the present invention is not limited to landline implementations, but rather can include mobile service as well and, as mentioned above, various embodiments can utilize various networking protocols such as SS7. Furthermore, although, FIG. 1A shows the invention in the context of an Access NP voicemail platform, the invention is applicable to a variety of voicemail systems such as the system shown in FIG. 9 described more fully below.

Figure 1B:
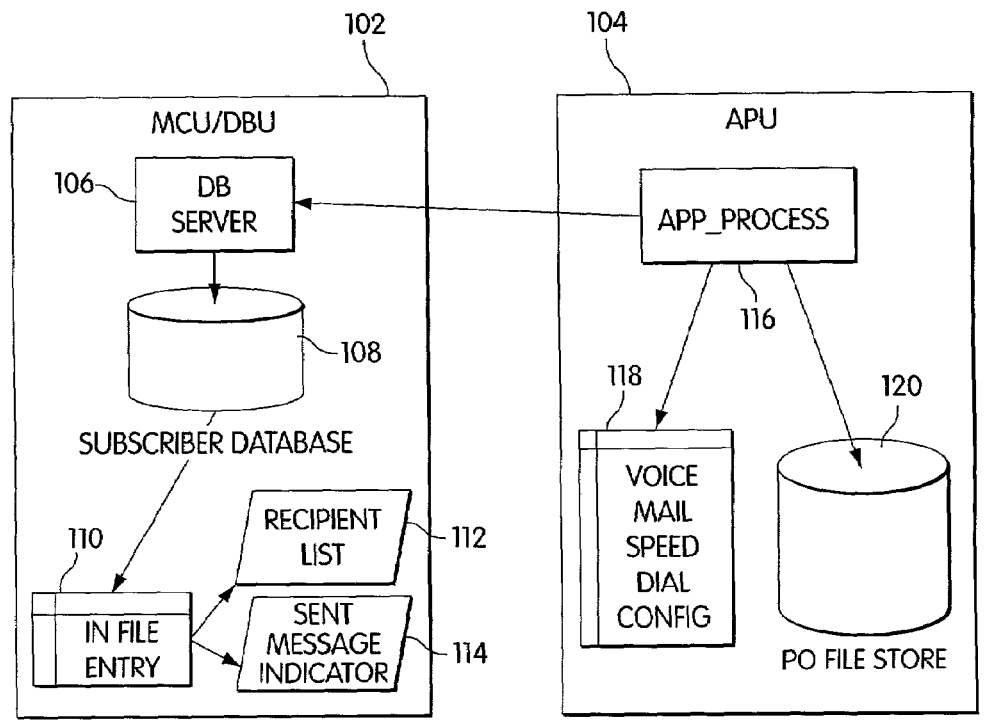
FIG. 1B is a schematic diagram of components of the voicemail system of FIG. 1A.

With reference to FIG. 1B, an APU/VPU 104 communicates with a master control unit (MCU)/database unit (DBU) 102. The MCU/DBU 102 includes a database server 106 that communicates with a subscriber database 108. The subscriber database 108 contains provisioning information used to determine if the sent message access capability is available and whether the recipient list should be made available to a subscriber. The subscriber database 108 also contains information pertaining to the subscriber's messages including the recipient list 112 and sent message indicators 114.

The APU 104 includes an application processor 116, which communicates with voicemail speed dial configuration internal storage 118 and the voice and data storage 120. In other words, the APU/VPU 104 obtains data related to subscriber capabilities such as whether a subscriber has a reply-to-all capability, whether a subscriber has the ability to access a recipient list, or whether a subscriber has the ability to access a sent message folder, through a query to the subscriber database 108 on the MCU/DBU 102. The voice and data storage, e.g., Post Office file store 120, on the APU 104 stores raw Voice/Fax data. In one embodiment, the database server 106 and the subscriber database 108 are located on the MCU 102. However, in other voicemail systems, they might be stored elsewhere, for example in a centralized Lightweight Directory Access Protocol (LDAP) directory or database. Furthermore, although the subscriber database 108 and the voice and data storage 120 are shown as separate databases, in an alternative embodiment, they could be combined. However, it is advantageous to ensure that the voice and data storage 120 is scalable.

Messages Sent Folder

In one embodiment, if the system, subscriber, or administrator enables the 'Save Sent Messages' feature, the subscriber receives a copy of each message sent to other subscribers. The system marks the message as a sent message using a message attribute, which the system retains with the message as part of an IN file entry 110 in the subscriber database 108.

Figure 2:
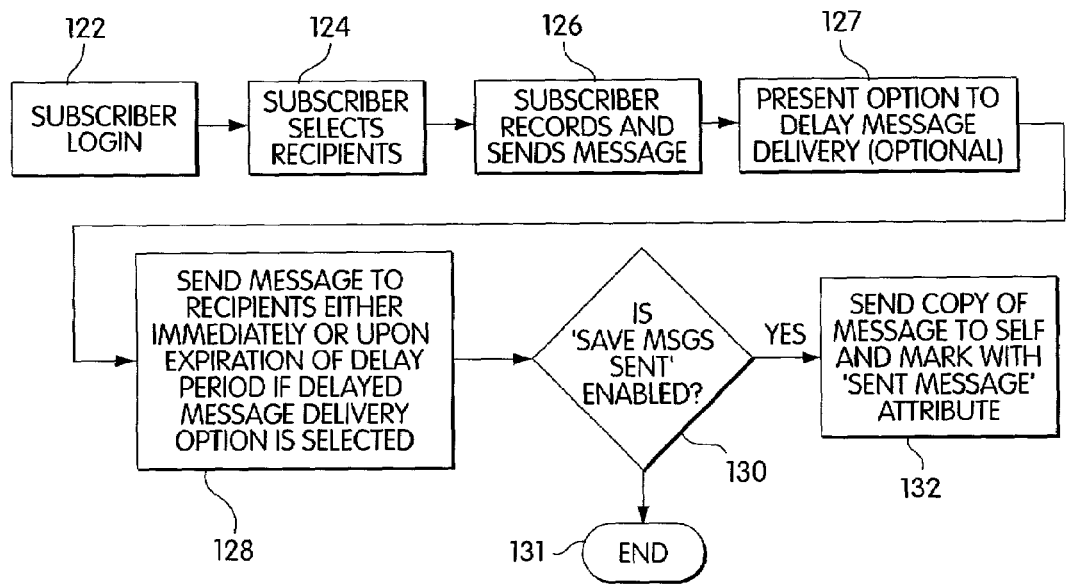
FIG. 2 is a flow chart depicting one embodiment of a process for saving messages sent using the system of FIGS. 1A and 1B.

FIG. 2 shows a flow chart depicting one embodiment of a process for saving messages sent using the system of FIGS. 1A and 1B. Subsequent to subscriber login 122, a subscriber selects 124 recipients for a message. The subscriber then records a message and indicates 126 that the system should send the message. The system sends 128 the message to the selected recipients. The system then checks 130 whether the system, the subscriber, or an administrator has enabled the save messages sent feature. If so, the system sends a copy of the message to the subscriber and marks 132 the message with a sent message attribute.

Figure 3:
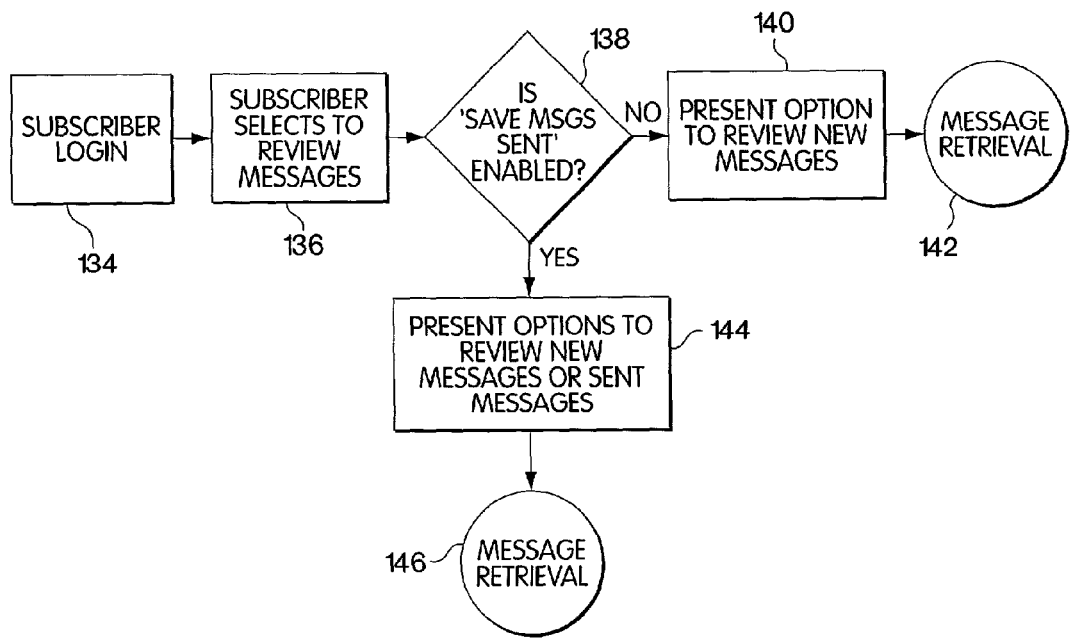
FIG. 3 is a flow chart depicting one embodiment of a process for retrieving sent messages using the system of FIGS. 1A and 1B.

FIG. 3 is a flow chart depicting one embodiment of a process for retrieving sent messages using the system of FIGS. 1A and 1B. Upon message retrieval, a system according to one embodiment of the invention provides a subscriber the option of hearing messages sent via a distinct option from a subscriber interface. Messages sent will be purged from the system based on a configurable sent message retention time. With reference to FIG. 3, subsequent to subscriber login 134, a subscriber opts 136 to review messages. The system checks 138 whether the system, the subscriber, or an administrator has enabled the save sent messages feature. If so, the system presents 144 to the subscriber the option of reviewing received messages or sent messages. In response the subscriber's selection, the system retrieves 146 the appropriate messages. If the system, the subscriber, or an administrator has not enabled the save sent messages feature, the system only presents 140 the subscriber the option to review received messages, and the sent messages will not be accessible. In response to an affirmative response from the subscriber, the system retrieves 142 the received messages.

Recipient List Access/Reply to All

Figure 4:
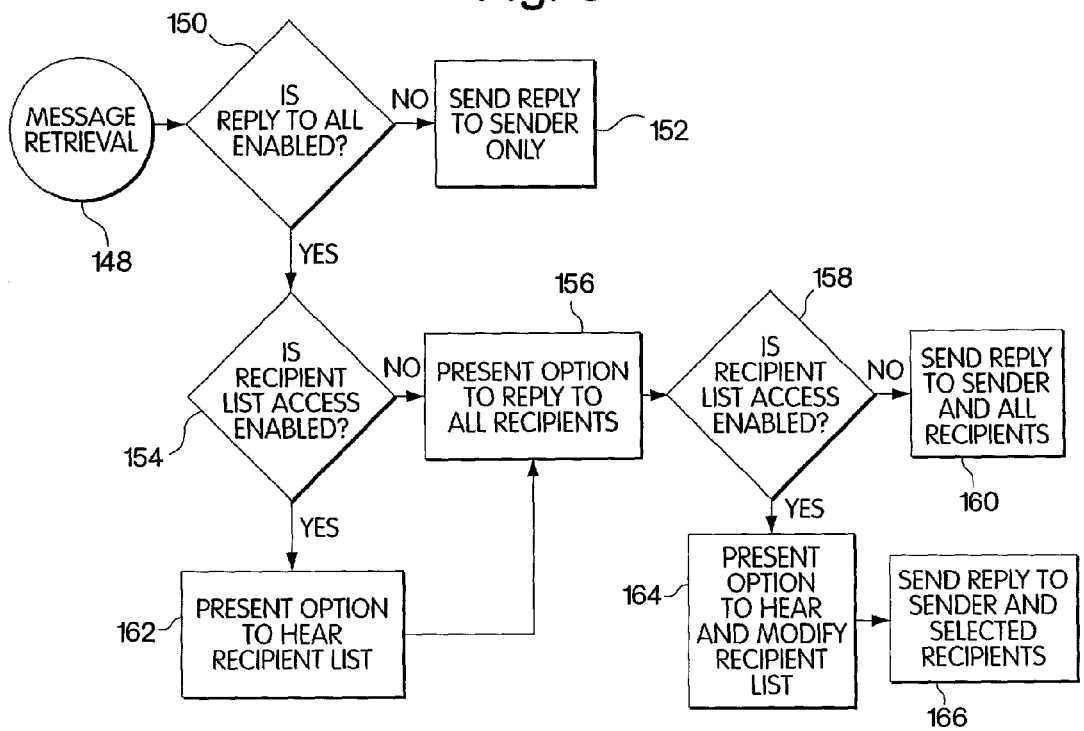
FIG. 4 is a flow chart depicting one embodiment of a process for providing a reply to all or a reply to selected recipients option to a subscriber using the system of FIGS. 1A and 1B.

FIG. 4 is a flow chart depicting one embodiment of a process for providing a reply to all or a reply to selected recipients option to a subscriber using the system of FIGS. 1A and 1B. Upon message retrieval 148, the system checks 150 whether the system, the subscriber, or an administrator has enabled reply to all. If not, the system provides the subscriber an option to send 152 a reply to the sender (only) of the original message. If so, the system checks 154 to determine if the system, the subscriber, or an administrator has enabled recipient list access. If recipient list access is enabled, the system presents 162 the subscriber with an option to hear the recipient list and then presents 156 the subscriber the option to reply to all recipients. If not, the system transfers directly to step 156.

Next, the system again checks 158 whether the system, the subscriber, or an administrator has enabled recipient list access. If so, the system presents 164 to the subscriber an option to hear and modify the recipient list. In one embodiment, the system expands personal group lists prior to presentation of the recipient list. If the system provides a blind copy option, the system does not include blind-copied recipients in the recipient list. Once the subscriber has heard the recipient list and added or removed recipients from the list, the system sends 166 the reply to the sender and selected recipients. If the recipient list access is not enabled, then the system sends 160 the reply to the sender and all recipients.

Figure 5:
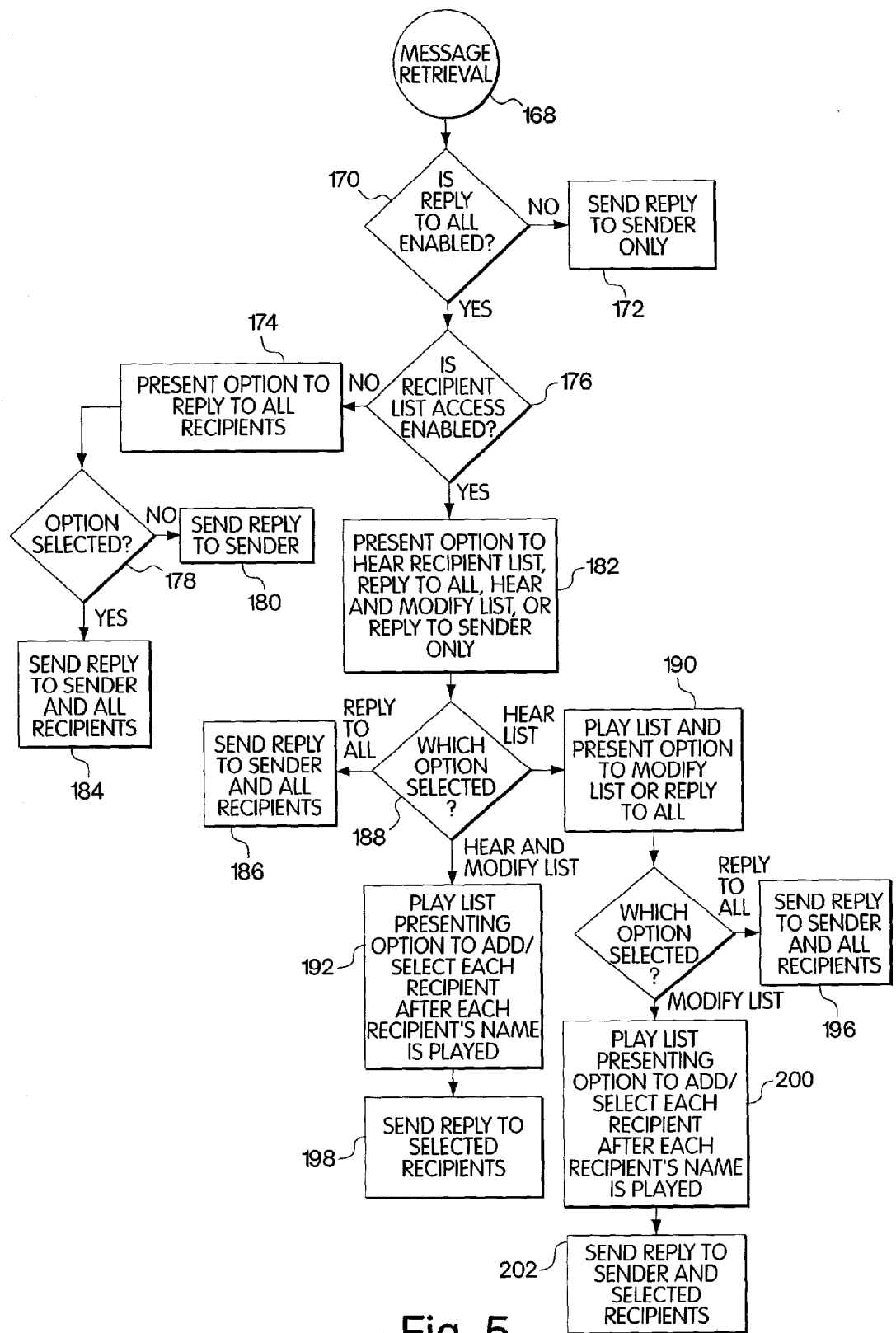
FIG. 5 is a flow chart depicting another embodiment of a process for providing a reply to all or a reply to selected recipients option to a subscriber using the system of FIGS. 1A and 1B.

FIG. 5 is a flow chart depicting another embodiment of a process for providing a reply to all or a reply to selected recipients option to a subscriber using the system of FIGS. 1A and 1B. Upon message retrieval 168, the system checks 170 whether reply to all is enabled. If not, the system sends 172 a reply to the sender alone. If so, the system checks 176 whether recipient list access is enabled. If not, the system presents 174 an option to the subscriber to reply to all recipients. If the subscriber responds affirmatively, the system sends 184 a reply to the sender and all recipients. If the subscriber responds negatively, the system sends 180 a reply to the sender only.

If the recipient list access is enabled, the system presents 182 an option to 1) reply to all, 2) hear the recipient list, 3) hear and modify the list, or 4) reply to the sender only. If the subscriber selects 188 the reply to all option, the system sends 186 a reply to the sender and all recipients. If the subscriber selects the hear and modify list option, the system 192 plays the list and presents the option to add to or remove from the list. Once the subscriber finishes selecting recipients, the system sends 198 a reply to the selected recipients. If the subscriber selects the hear list option, the system plays 190 the list and presents an option to modify the list. If the subscriber selects the reply to all option, the system sends 190 a reply to the sender and all recipients. If the subscriber selects the modify list option, the system plays 200 the list and allows the subscriber to add to remove from the list. Once the subscriber finishes selecting the recipients, the system sends the message to selected recipients. In one embodiment, the ability to review message recipients allows a subscriber to specify urgency/privacy or return receipt on a per recipient basis.

Personal Speed Dial

Another embodiment of a system according to the invention allows a subscriber to configure a personal speed dial directory using an audio-based user interface. For each entry (telephone or mailbox number), the system allows a user to specify a speed dial code of up to 3 digits and record a name for identification. Alternatively, the system can allow a subscriber to use a dual tone multi-frequency (DTMF) access code corresponding to at least some of the letters of the recipient's name.

Figure 6:
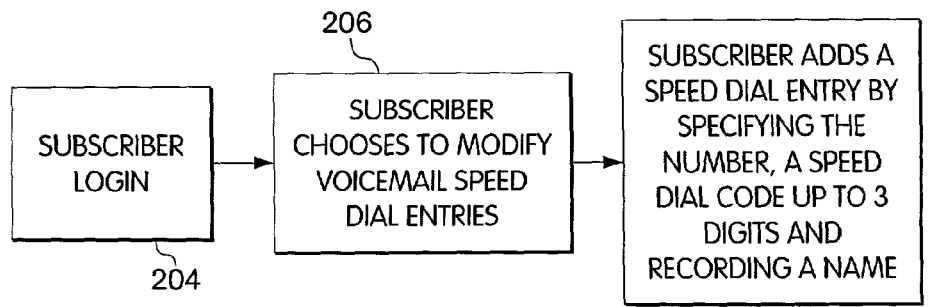
FIG. 6 is a flow chart depicting one embodiment of a process for modifying a speed dial entry using the system of FIGS. 1A and 1B.

FIG. 6 is a flow chart depicting one embodiment of a process for modifying a speed dial entry using the system of FIGS. 1A and 1B. Upon subscriber login 204, a subscriber can choose 206 to modify voicemail speed dial entries. A subscriber can add entries 208 to the personal speed dial list manually, by entering the digits that correspond to the recipient's phone number. Entries can also be added automatically, providing CLI is available, from the Reply menu. In the latter case, one of the reply options allows the subscriber to add the sender's number to the personal speed dial list and record a name for the entry.

Figure 7:
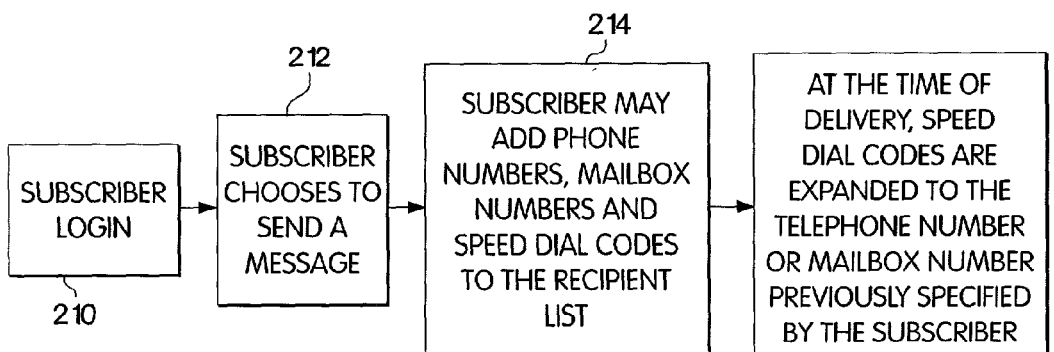
FIG. 7 is a flow chart depicting one embodiment of a process for sending a message in which a subscriber can use speed dial codes to indicate recipients of the message.

When addressing a message, the subscriber can enter the speed dial code or review the speed dial entries and select the desired recipient. FIG. 7 is a flow chart depicting one embodiment of a process for sending a message in which a subscriber can use speed dial codes to indicate recipients of the message. Upon subscriber login 210, the subscriber chooses 212 to send a message. The subscriber may then input 214 phone numbers, mailbox numbers and speed dial codes to indicate additions to the recipient list. At the time of delivery, the system correlates 216 the speed dial codes to their associated phone numbers or mailbox numbers.

Messages Sent Indicator

As an alternative to a distinct messages sent folder, a system according to one embodiment can mark messages as sent and played back as part of the normal new message retrieval. When the system encounters a sent message, the system plays a prompt indicating that the message is a "Sent Message," and the system plays the message.

Voice Message Foldering

Voice message foldering allows for the organization of messages via a voice interface. One embodiment of voice message foldering supports the creation, deletion, and inventory of individual folders or groupings of messages and gives menu options for the disposal of messages. For example, in addition to current menu options 1-replay, 2-save, 3-delete, 4-reply, 5-forward, there can be 6-save to folder and 7-copy to folder.

Figure 8:
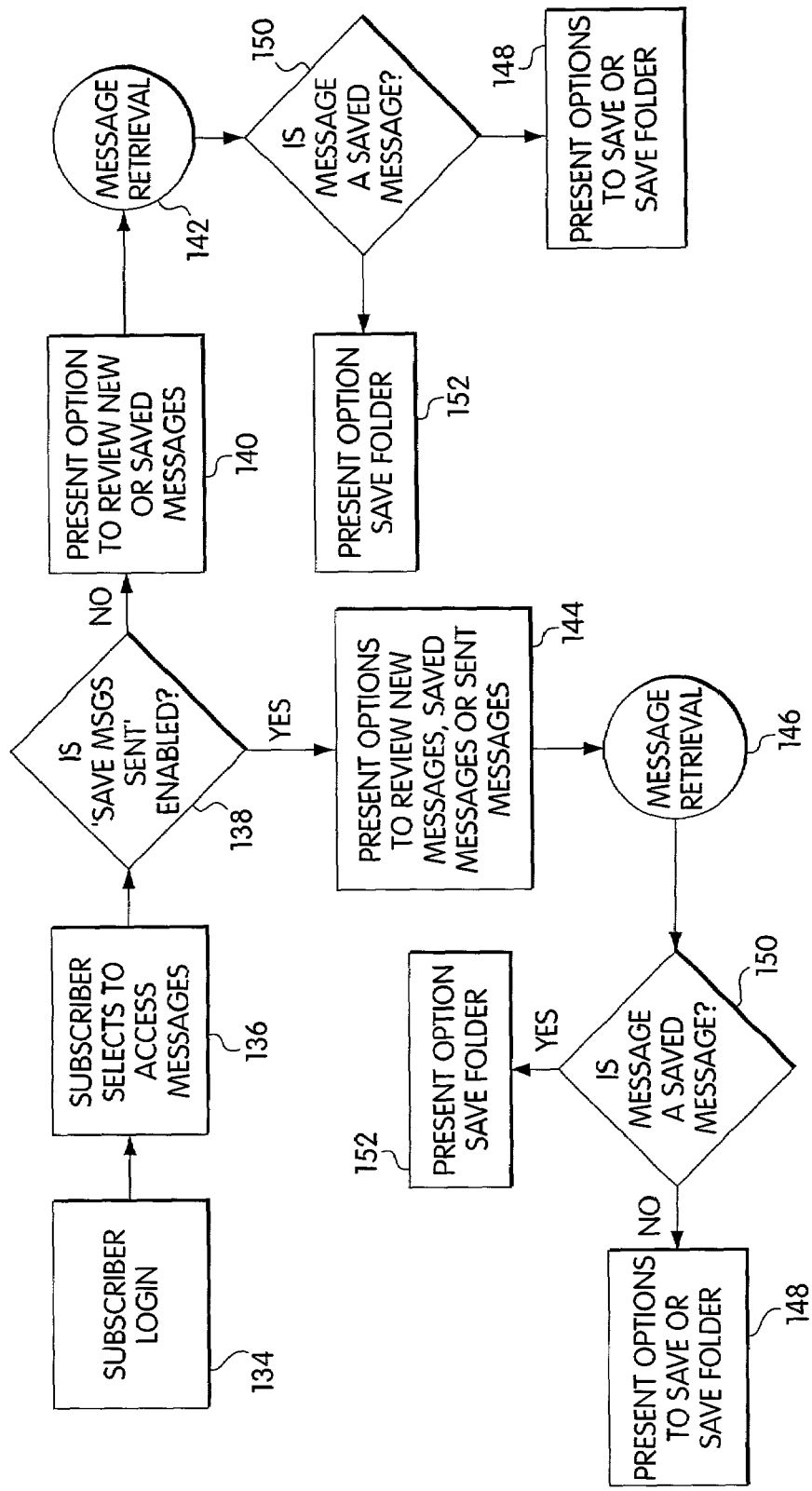
FIG. 8 is a flow chart depicting one embodiment of a process for performing voice message foldering using the system of FIGS. 1A and 1B.

After a user selects save/copy to folder, the system can present the menu of available folders in the same manner as group lists (press 1 for "recorded folder tag", etc.). A simple save would merely keep messages in the general in-box. According to one embodiment, the system uses voice recognition for save folder commands, such as "SAVE FOLDER 1" or "SAVE FOLDER WORK". The voice recognition need only match a previously recorded folder tag and does not necessarily require a dictionary lookup. For example, folder names can include: "WORK"; "JUNK"; "FROMTHEBOSS"; and "PRIVATE." FIG. 8 is a flow chart similar to FIG. 3 depicting one embodiment of a process for voice message foldering using the system of FIGS. 1A and 1B. A system according to one embodiment of the invention provides a subscriber the option of hearing sent messages via a distinct option from a subscriber interface. Sent messages are purged from the system based on a configurable sent message retention time. With reference to FIG. 8, subsequent to subscriber login 134, a subscriber opts 136 to review messages. The system checks 138 whether the system, the subscriber, or an administrator has enabled the save sent messages feature. If so, the system presents 144 to the subscriber the option of reviewing new messages, saved messages or sent messages. In response to the subscriber's selection, the system retrieves 146 the appropriate message(s). If the system, the subscriber, or an administrator has not enabled the save sent messages feature, the system only presents 140 the subscriber the option to review new or saved messages, and the sent messages will not be accessible. In response to the subscriber's selection, the system retrieves 142 the appropriate message(s).

Whether or not the save sent messages feature is enabled, upon retrieval of a message, the system determines 150 if the retrieved message is a saved message. If the message is not a saved message, the system presents 148 options to Save or Save Folder. If the message is a saved message, the system presents 152 a Save Folder option. The Save operation saves a message without a folder affiliation. The Save Folder operation saves a message and affiliates the message with a specified folder. In one embodiment, the system completes the Save Folder operation when the user provides a code specifying a folder.

Delayed Message Delivery

One embodiment of a system or method according to the invention provides a subscriber the option to delay message deliveries on a per message basis or for all messages sent from the mailbox. In one embodiment, the duration of the delay can be fixed, e.g., at 1 hour (or 1 day), and can lead to automatic sending or automatic deletion (based on subscriber preference). This delay can be implemented using a future delivery mechanism, which stores a copy of the message in the dispatch queue until the message send time elapses (and at that point the message is sent or deleted automatically based on mailbox configuration).

According to one embodiment, until the time a message is sent, a subscriber can access all "delayed" messages by accessing an Outbox folder. The messages in this folder could be reviewed like any other message in the mailbox including reviewing the recipient list, re-recording the message (using reply to all if the same recipients are needed), changing urgency or privacy status or sending the message immediately in its original form. Alternatively, "delayed" messages could be stored in the sent message folder with an indication that they are delayed messages.

Alternative Embodiment

Figure 9:
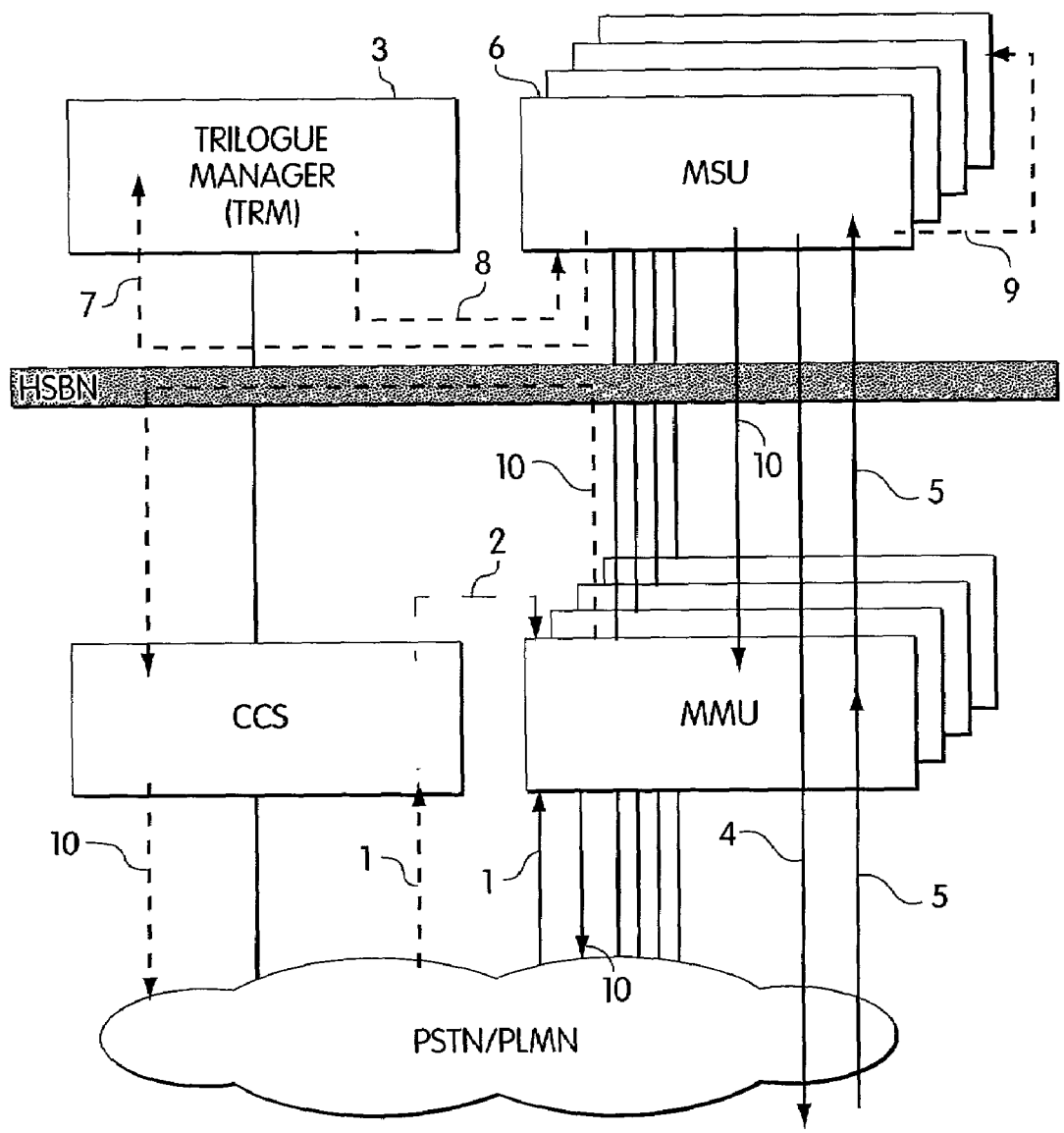
FIG. 9 is schematic diagram of a voicemail system according to another embodiment of the invention.

FIG. 9 shows an alternative embodiment of a voicemail system according to the invention. This embodiment uses a system with a multi-server architecture, and a modular design such as the Trilogue Infinity available from Comverse Network Systems of Wakefield, Mass. The illustrated embodiment consists of the following subsystems:

High Speed Backbone Network (HSBN): A redundant LAN, the HSBN connects the subsystems. The HSBN also facilitates voice messaging communication between subscribers whose voice mailboxes are located on different messaging and storage units (MSUs). The HSBN consists of a high capacity redundant hub comprising Ethernet segments.

Call Control Server (CCS): The CCS handles call processing, interfaces with the telephone network Signaling System No. 7 (SS7) or with SMDI. It operates in conjunction with the multimedia units (MMUs), providing call signaling information.

MultiMedia Unit (MMU): The MMU is the telephone front-end module of the TRILOGUE INfinity system. It contains the telephony ports that interface with the telephone network, as well as the support hardware and software that handles the telephone call interaction.

Messaging and Storage Unit (MSU): The MSU provides both the application logic and the storage and retrieval of digitized information, including voice and fax messages, subscriber personal greetings, etc. The MSU storage functions include the management of subscriber mailboxes and of the actual voice and data files in which messages, greetings, and recorded names are stored. Each MSU supports up to 60,000 mailboxes, and redundant storage space of up to 1,000 hours is dynamically allocated as needed, not only among all subscribers and applications, but also between voice and fax.

TRILOGUE Manager (TRM): The TRM is the central management station of a TRILOGUE INfinity system. The TRM is the focus of all Operation, Maintenance, Administration, and Provisioning (OMAP) activities.

Multiple administrators and operators can access the TRM, either locally, at the system site, or via remote communication links.

The TRM also implements the Integrated Alarm Processor (IAP), which monitors, in real-time, the operation and performance of all system components, including telephone ports, processors, storage devices and all critical units. The IAP processes the system alarms and reports, and displays them.

The functionality of the MCU/DBU and APU/VPU of FIG. 1B can be contained in the MSU alone or in combination with the TRM. FIG. 9 provides a simplified picture of recording and sending a voice message.

1. The subscriber dials the access number of the TRILOGUE INfinity VMS. If the switch uses SS7 signaling or SMDI, a signal is sent to the CCS, otherwise, the signal goes to the MMU.

2. On SS7 and SMDI systems, the CCS alerts an MMU of an incoming call on port X channel Y through the HSBN. The subscriber is greeted by the system by and is then prompted for his mailbox number. The subscriber dials in his mailbox number.

3. The MMU connects the incoming call to the MSU that contains the subscriber's mailbox. The MMU and the connected MSU are logically connected for the duration of the call.

4. The subscriber is prompted for an action and after answering with the DTMF for sending a message, the subscriber is prompted to provide a message destination and then to record the voice message. The MMU builds a voice buffer, formats and compresses the incoming voice, and sends it to the buffer.

5. When the caller indicates that the message is finished—by DTMF or by hanging up, the MMU sends the contents of the buffer to the MSU for storage.

6. If the destination is the number of a mailbox in the system, the MSU checks if the mailbox is located on the same MSU. If so, the MSU deposits the recorded message in the destination mailbox.

7. If the mailbox is not found on the MSU, the MSU queries the TRM for the address of the MSU that contains the destination mailbox.

8. The TRM returns the address of the MSU that contains the destination mailbox.

9. The MSU sends the recorded message to the MSU that contains the destination mailbox where it is stored.

10. If the destination is a telephone outside the voice mail system, then the MSU instructs the MMU to call the destination number. If the switch uses SS7 signaling or SMDI, the CCS sends it a signal, otherwise, the MMU handles all the telephony.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method comprising:
retrieving, via a voice interface, a voicemail message sent to specified recipients; and
providing the specified recipients with an option to enable a reply-to-all function;
if reply-to-all function is enabled, providing an option to reply-to-all specified recipients and the sender, wherein the option is selectable via the voice interface;
wherein the voice interface is responsive to commands from a telephone keypad.

2. The method of claim 1, wherein the method further comprises: subsequent to receiving a selection of the option, sending a reply message to the sender and each of the specified recipients.

3. The method of claim 1, wherein the method further comprises:
determining if a recipient access list is enabled;
if the recipient list access is enabled, providing a select recipient option to allow a subscriber to select recipients from the recipient list; and
if the select recipient option is selected, sending a reply message to each of the selected recipients.

4. A method comprising:
retrieving, via a voice interface, a voicemail message sent to selected recipients; and
providing the selected recipients with an option to enable a reply-to-all function;
providing an option to reply-to-all recipients and the sender, wherein the option is selectable via the voice interface;
wherein the voice interface is responsive to commands from a telephone keypad.

5. The method of claim 4, wherein the method further comprises: subsequent to receiving a selection of the option, sending a reply message to the sender and each of the specified recipients.

6. The method of claim 4, wherein the method further comprises:
determining if a recipient access list is enabled;
if the recipient access list is enabled, allowing a subscriber to hear and modify the recipient list to produce a reviewed recipient list; and
sending a reply message to each of the recipients in the reviewed recipient list.

7. The method of claim 1, wherein the voice interface is responsive to voice commands.

8. The method of claim 4, wherein the voice interface is responsive to voice commands.

* * * * *